United States Patent
Suwa et al.

(10) Patent No.: US 12,110,925 B2
(45) Date of Patent: Oct. 8, 2024

(54) ROLLER BEARING

(71) Applicant: NSK LTD., Tokyo (JP)

(72) Inventors: Tomonori Suwa, Fujisawa (JP); Kentaro Oguma, Fujisawa (JP); Yoshinori Maeda, Fujisawa (JP)

(73) Assignee: NSK LTD., Tokyo (JP)

( * ) Notice: Subject to any disclaimer, the term of this patent is extended or adjusted under 35 U.S.C. 154(b) by 180 days.

(21) Appl. No.: 17/796,079

(22) PCT Filed: Jan. 29, 2021

(86) PCT No.: PCT/JP2021/003434
§ 371 (c)(1),
(2) Date: Jul. 28, 2022

(87) PCT Pub. No.: WO2021/153793
PCT Pub. Date: Aug. 5, 2021

(65) Prior Publication Data
US 2023/0084172 A1    Mar. 16, 2023

(30) Foreign Application Priority Data
Jan. 30, 2020   (JP) ................................. 2020-014135

(51) Int. Cl.
*F16C 33/58*     (2006.01)
*F16C 19/26*     (2006.01)
(Continued)

(52) U.S. Cl.
CPC ............ *F16C 33/585* (2013.01); *F16C 19/26* (2013.01); *F16C 19/364* (2013.01); *F16C 33/366* (2013.01); *F16C 2240/50* (2013.01)

(58) Field of Classification Search
CPC ........ F16C 33/34; F16C 33/366; F16C 33/64; F16C 33/58; F16C 33/585; F16C 2240/50; F16C 2300/02; F16C 19/26; F16C 19/364
See application file for complete search history.

(56) References Cited

U.S. PATENT DOCUMENTS

2004/0264825 A1* 12/2004 Kamamura ............. B24B 33/04
                                                           384/568
2012/0033909 A1*  2/2012 Fujiwara ............... F16C 19/364
                                                           703/1
(Continued)

FOREIGN PATENT DOCUMENTS

DE    102008020068 A1   10/2009
EP      3511586 A1    7/2019
(Continued)

OTHER PUBLICATIONS

Machine Translation of JP 2012-107702 (Year: 2012).*
(Continued)

*Primary Examiner* — Alan B Waits
(74) *Attorney, Agent, or Firm* — Sughrue Mion, PLLC

(57) ABSTRACT

A generatrix shape to which crowning is applied includes a first generatrix shape which is formed in a central portion in an axial direction of at least one of an outer ring raceway surface, an inner ring raceway surface, and a rolling surface of a roller and is composed of a straight line, a pair of second generatrix shapes which are formed from both ends in the axial direction toward the outside in the axial direction of the first generatrix shape and are composed of a single arc curve, and a pair of third generatrix shapes which are formed from both ends in the axial direction toward the outside in the axial direction of the second generatrix shape and are composed of a composite curve of a single arc curve and a logarithmic curve.

4 Claims, 7 Drawing Sheets

(51) Int. Cl.
   *F16C 19/36*   (2006.01)
   *F16C 33/36*   (2006.01)

(56) References Cited

U.S. PATENT DOCUMENTS

| | | | |
|---|---|---|---|
| 2018/0258985 A1* | 9/2018 | Kawai | F16C 33/585 |
| 2019/0076977 A1* | 3/2019 | Higashi | B24B 35/00 |
| 2019/0219098 A1 | 7/2019 | Matsushita | |
| 2020/0056655 A1 | 2/2020 | Matsushita et al. | |
| 2020/0158167 A1 | 5/2020 | Maeda et al. | |
| 2021/0301867 A1 | 9/2021 | Matsushita | |

FOREIGN PATENT DOCUMENTS

| | | |
|---|---|---|
| JP | 2010-106975 A | 5/2010 |
| JP | 2010-164179 A | 7/2010 |
| JP | 2012-107702 A | 6/2012 |
| JP | 5056115 B2 | 10/2012 |
| WO | 2018/020951 A1 | 2/2018 |
| WO | 2018/047641 A1 | 3/2018 |
| WO | 2018-151209 A1 | 8/2018 |
| WO | 2018/190134 A1 | 10/2018 |

OTHER PUBLICATIONS

Machine Translation of JP 2010-164179 (Year: 2010).*
International Search Report (PCT/ISA/210) dated Apr. 6, 2021, issued by the International Searching Authority in counterpart International Application No. PCT/JP2021/003434.
Written Opinion (PCT/ISA/237) dated Apr. 6, 2021, issued by the International Searching Authority in counterpart International Application No. PCT/JP2021/003434.
Communication dated May 22, 2023 by the European Patent Office in counterpart European Application No. 21746983.2.

* cited by examiner

ROLLER BEARING

CROSS-REFERENCE TO RELATED APPLICATIONS

This application is a National Phase Entry of PCT International Application No. PCT/JP2021/003434, filed on Jan. 29, 2021, which claims priority to Japanese Patent Application No. 2020-014135 filed on Jan. 30, 2020, the contents of all of which are incorporated herein by reference in their entirety.

TECHNICAL FIELD

The present invention relates to a roller bearing, and more particularly to a bearing with crowning that can extend a life of the bearing in a wide load range from a light load condition to a heavy load condition.

BACKGROUND ART

In a roller bearing of the related art, in order to prevent edge load from occurring at both end portions of a rolling surface of a roller in an axial direction due to line contact between the rolling surface of the roller and raceway surfaces of outer and inner rings, crowning is applied to at least one of the raceway surfaces of the outer and inner rings and the rolling surface of the roller. In Patent Literature 1 described below, in order to prevent occurrence of edge load under a heavy load condition and to prevent a bearing life from being shortened under a light load condition to a medium load condition, it is known that at least one of the raceway surfaces of the outer and inner rings and the rolling surface of the roller is subjected to arc logarithmic crowning composed of an arc curve formed in a central portion in the axial direction and a composite curve of an arc curve and a logarithmic curve formed from both ends in the axial direction to outer end portions in the axial direction of the arc curve (see, for example, Patent Literature 1).

CITATION LIST

Patent Literature

Patent Literature 1: JP-B-5056115

SUMMARY OF INVENTION

Technical Problem

However, in the roller bearing described in Patent Literature 1, since an arc curve is formed in the central portion in the axial direction, under a light load condition to a medium load condition, a contact surface pressure at a central portion of a contact region in the axial direction is higher than a contact surface pressure at an end portion in the axial direction of the contact region, and thus it may be difficult to make contact surface pressure distribution in the axial direction uniform. As a result, there is a possibility of hindering extension of the bearing life under a light load condition to a medium load condition. In addition, it has been required to extend the life of the bearing under a heavy load condition.

The present invention is made in view of the problem described above, and an object of the present invention is to provide a roller bearing capable of extending a life of a bearing in a wide load range from a light load condition to a heavy load condition.

The above-described object of the present invention is achieved by the following configuration.

(1) A roller bearing includes
an outer ring having an outer ring raceway surface on an inner peripheral surface, an inner ring having an inner ring raceway surface on an outer peripheral surface, and a plurality of rollers rotatably arranged between the outer ring raceway surface and the inner ring raceway surface and having rolling surfaces on outer peripheral surfaces, where
crowning is applied to at least one of the outer ring raceway surface, the inner ring raceway surface, and the rolling surface, and
a generatrix shape to which the crowning is applied includes a first generatrix shape which is formed in a central portion in an axial direction of at least one of the outer ring raceway surface, the inner ring raceway surface, and the rolling surface of the roller and is composed of a straight line,
a pair of second generatrix shapes which are formed from both ends in the axial direction toward the outside in the axial direction of the first generatrix shape and are composed of a single arc curve, and
a pair of third generatrix shapes which are formed from both ends in the axial direction toward the outside in the axial direction of the second generatrix shape and are composed of a composite curve of a single arc curve and a logarithmic curve.

(2) The roller bearing according to (1), where
when a center of the first generatrix shape in the axial direction is set to an origin 0, an amount of displacement from the origin 0 to the outside in the axial direction is set to X, and a crowning drop amount of the crowning is set to $\delta$,
La is set as an axial length from the origin 0 of the first generatrix shape,
Lb is set as an axial length of the second generatrix shape,
Le is set as an effective contact length between the rolling surface of the roller and the inner ring raceway surface or the outer ring raceway surface,
R is set as an arc radius of the single arc curve of the second generatrix shape,
Q is set as a contact load between the rolling surface of the roller and the inner ring raceway surface or the outer ring raceway surface,
$\nu_1$ and $\nu_2$ are set as a Poisson's ratio of the rolling surface of the roller and the inner ring raceway surface or the outer ring raceway surface,
E1 and E2 are set as a Young's modulus of the rolling surface of the roller and the inner ring raceway surface or the outer ring raceway surface, and
b is set as ½ of a contact width of Hertz,
the crowning drop amount $\delta$ in the first generatrix shape is defined by a formula of $0 \leq X \leq La,$ $\delta = 0$ $0 \leq X \leq La$ $\delta = 0,$ [Equation 1]

the crowning drop amount $\delta$ in the second generatrix shape is defined by a formula of $La < X \leq La+Lb$, $\delta = R - \sqrt{R^2-(X-La)^2}$ $La < X \leq La+Lb$ $\delta = R - \sqrt{R^2-(X-La)^2}$, [Equation 2]

and the crowning drop amount δ in the third generatrix shape is defined by a formula of

[Equation 3]
$$La + Lb < X \leq Le \quad \delta =$$

$$R - \sqrt{R^2-(X-La)^2} + \frac{Q}{\pi Le}\left(\frac{1-v1^2}{E1} + \frac{1-v2^2}{E2}\right)$$

$$\ln\left\{1-\left(1-0.3033\frac{2b}{Le}\right)\left(\frac{2(X-(La+Lb))}{Le}\right)^2\right\}^{-1}$$

(3) The roller bearing according to (2), where
a length of the first generatrix shape is 55% to 75% of a total axial length of the first generatrix shape, the pair of second generatrix shapes, and the pair of third generatrix shapes.

(4) The roller bearing according to (3), where
an axial length of the third generatrix shape AS3 is set to 15% to 35% of a total axial length of the first generatrix shape AS1, the pair of second generatrix shapes AS2, and the pair of third generatrix shapes AS3.

(5) The roller bearing according to any one of (1) to (3), where
when the crowning is applied to at least two or more of the outer ring raceway surface, the inner ring raceway surface, and the rolling surface of the roller, a sum of crowning drop amounts of the crowning applied to at least two or more of the outer ring raceway surface, the inner ring raceway surface, and the rolling surface of the roller is set to match a crowning drop amount of the crowning applied to any one of the outer ring raceway surface, the inner ring raceway surface, and the rolling surface of the roller when the crowning is applied to only one of the outer ring raceway surface, the inner ring raceway surface, and the rolling surface of the roller.

Advantageous Effects of Invention

According to the present invention, since the generatrix shape to which crowning is applied uses both the first generatrix shape composed of a straight line and the second generatrix shape composed of an arc curve, under a light load condition to a medium load condition, the contact region between the roller and the outer and inner rings near the central portion in the axial direction can be efficiently secured as compared with the arc logarithmic crowning of the related art, and further, a joint between the first generatrix shape and the second generatrix shape can be smoothed. As a result, the contact surface pressure at the central portion in the axial direction of the contact region between the roller and the outer and inner rings is reduced, and a peak value of the contact surface pressure at the joint is suppressed. Therefore, the contact surface pressure distribution can be made uniform and the life of the bearing can be extended. Further, since the generatrix shape to which crowning is applied has the third generatrix shape composed of the composite curve of the single arc curve and the logarithmic curve, the life of the bearing can be extended even under the heavy load condition. Therefore, according to the present invention, the life of the bearing can be extended in a wide load range from the light load condition to the heavy load condition.

DESCRIPTION OF EMBODIMENTS

Hereinafter, an embodiment of a roller bearing according to the present invention will be described in detail with reference to the drawings.

Figure 1:
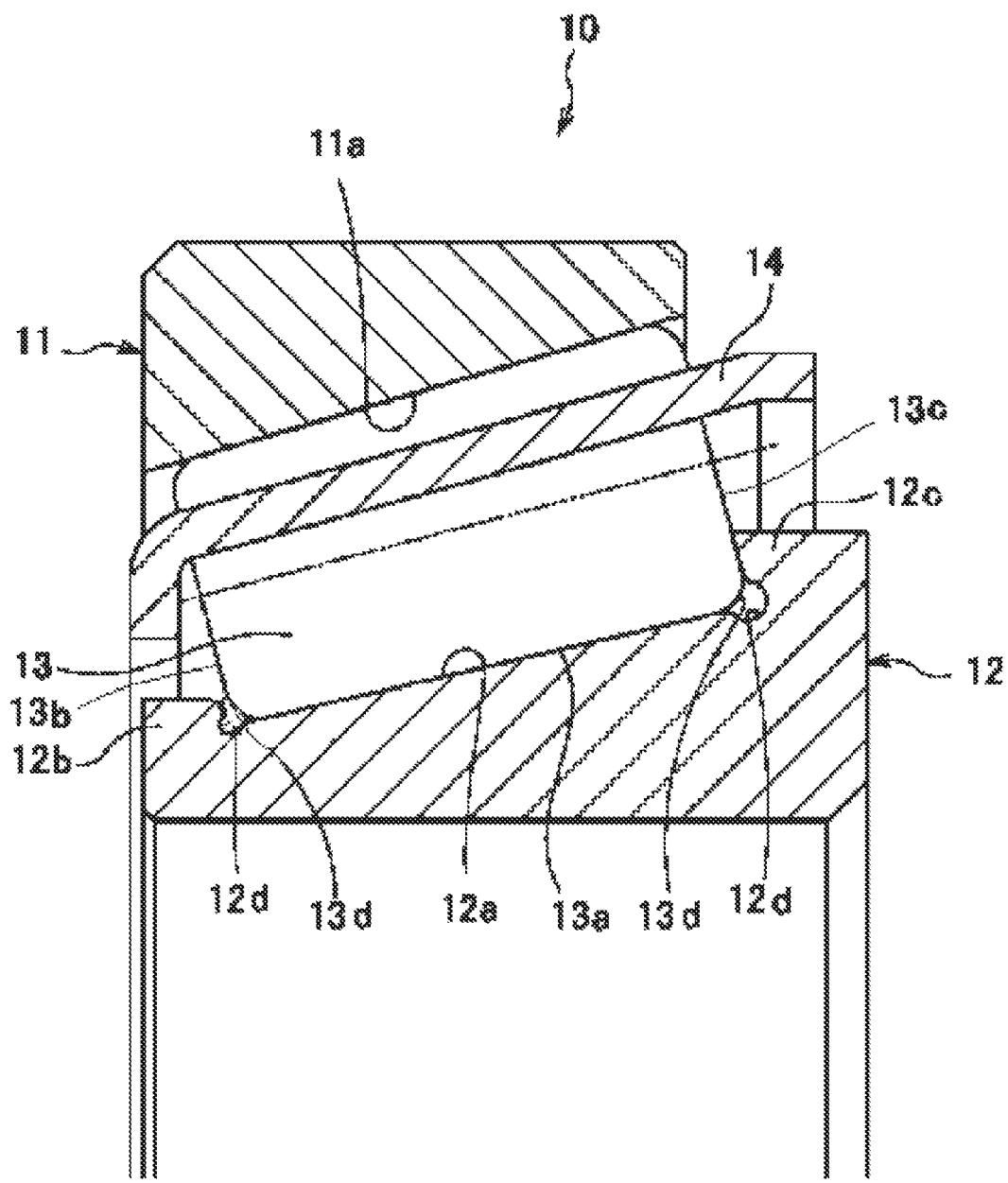
FIG. 1 is a vertical cross-sectional view of a main part for illustrating an embodiment of a roller bearing according to the present invention.

A tapered roller bearing (hereinafter, also simply referred to as "roller bearing") 10 of the present embodiment is a rolling bearing having a cage 14 as illustrated in FIG. 1. The roller bearing 10 includes an outer ring 11 having an outer ring raceway surface 11a on an inner peripheral surface, an inner ring 12 having an inner ring raceway surface 12a on an outer peripheral surface, a plurality of tapered rollers 13 rotatably arranged between the outer ring raceway surface 11a and the inner ring raceway surface 12a, and a cage 14 which holds the plurality of tapered rollers 13 at predetermined intervals in a circumferential direction. The roller bearing 10 does not have to be provided with a cage.

Flange portions 12b and 12c are respectively formed at both end portions of the outer peripheral surface of the inner ring 12 in an axial direction, and relief portions 12d are formed between the flange portions 12b and 12c and the inner ring raceway surface 12a. The tapered roller 13 has a rolling surface 13a in contact with the outer ring raceway surface 11a and the inner ring raceway surface 12a, and a pair of axial end surfaces 13b and 13c. Chamfered portions 13d having a curved shape are formed over the entire circumferences between axial end portions of the rolling surface 13a and the axial end surfaces 13b and 13c.

Then, in the present embodiment, crowning is applied to the rolling surface 13a of the tapered roller 13. In the present embodiment, a crowned generatrix shape AS (see FIG. 2) is applied only to the rolling surface 13a of the tapered roller 13, but is not limited to this. The generatrix shape AS may be applied to only one of the outer ring raceway surface 11a and the inner ring raceway surface 12a. Also, the generatrix shape AS may be applied to any two or more of the outer ring raceway surface 11a, the inner ring raceway surface 12a, and the rolling surface 13a of the tapered roller 13. When the generatrix shape AS is applied to at least two or more of the outer ring raceway surface 11a, the inner ring raceway surface 12a, and the rolling surface 13a of the tapered roller 13, the sum of crowning drop amounts of the generatrix shapes AS applied to at least two or more of the outer ring raceway surface 11a, the inner ring raceway surface 12a, and the rolling surface 13a of the tapered roller 13 may be set to match a crowning drop amount of the generatrix shape AS applied to any one of the outer ring raceway surface 11a, the inner ring raceway surface 12a, and the rolling surface 13a of the tapered roller 13 when the generatrix shape AS is applied to only one of the outer ring raceway surface 11a, the inner ring raceway surface 12a, and the rolling surface 13a of the tapered roller 13.

Figure 2:
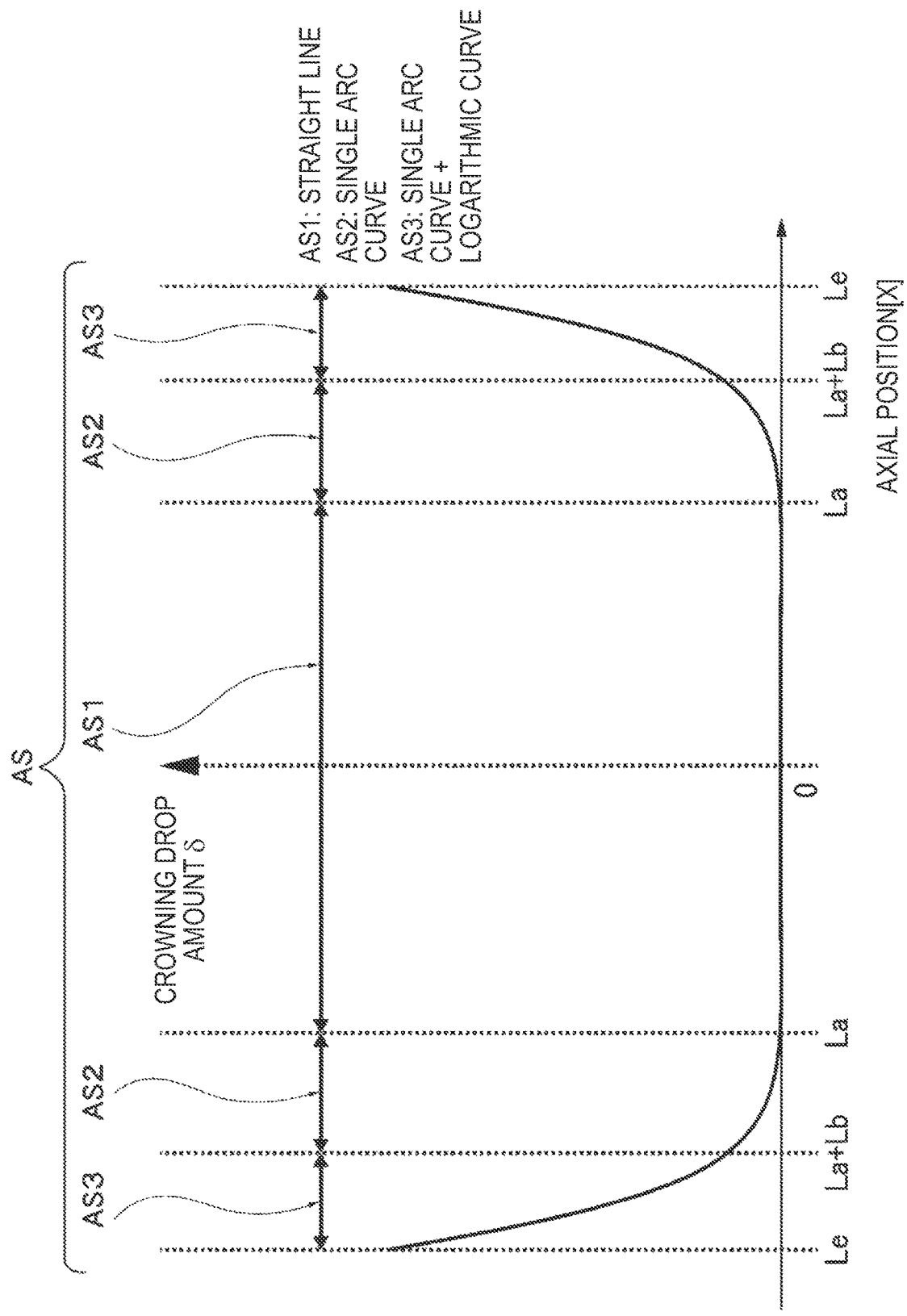
FIG. 2 is a schematic diagram illustrating a generatrix shape to which crowning of the present invention is applied.
Figure 3:
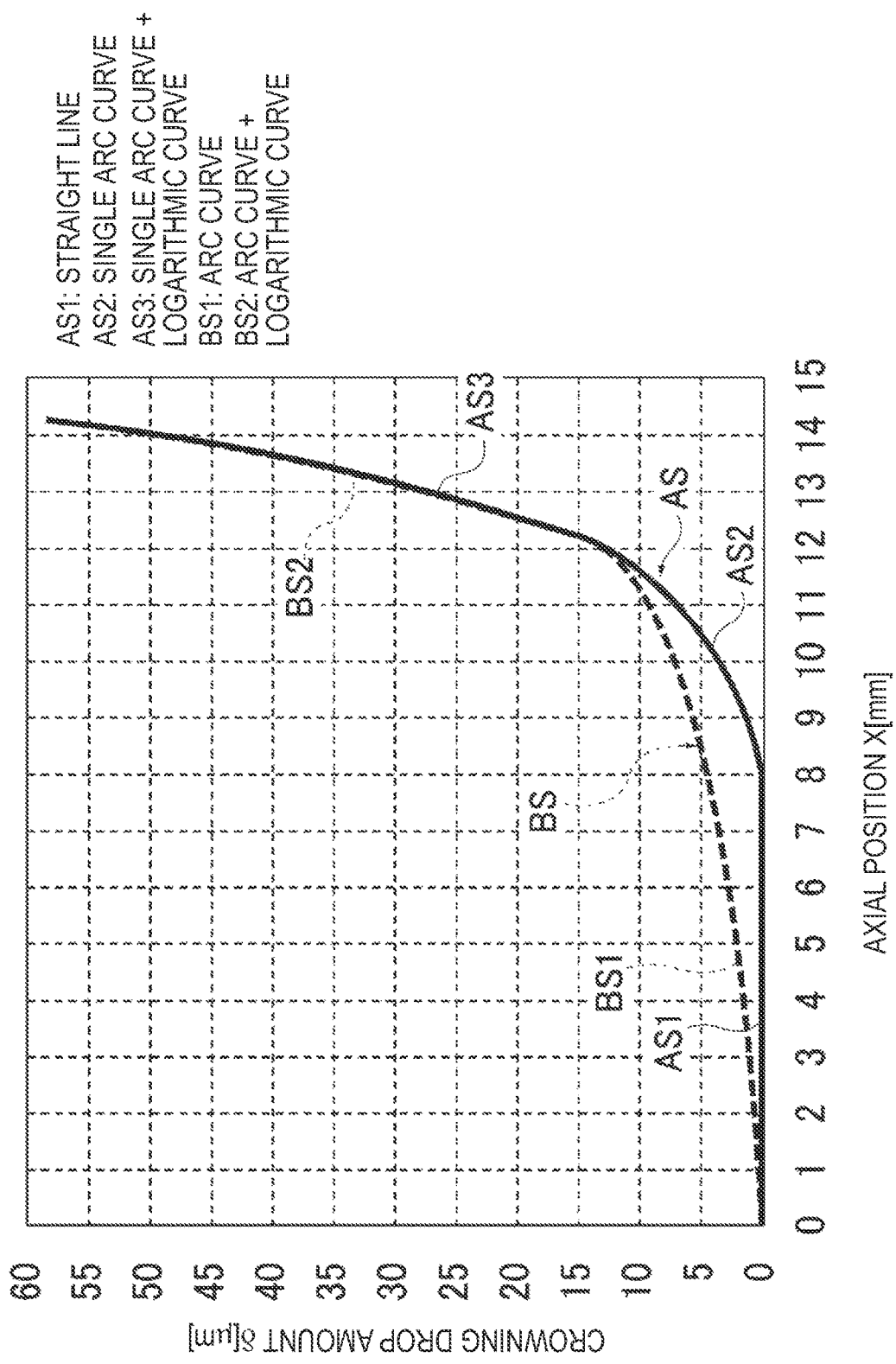
FIG. 3 is a graph illustrating crowning shapes of a present invention example and a comparative example of the present invention.

Next, the above-described generatrix shape AS will be described with reference to FIGS. 2 and 3. In FIGS. 2 and 3, an axial position of the generatrix shape AS (in the present embodiment, the rolling surface 13a of the tapered roller 13) is arranged on a horizontal axis, and the crowning drop amount is arranged on a vertical axis. In FIGS. 2 and 3, in order to emphasize the change in crowning, the scale (magnification) of the horizontal axis and the vertical axis is changed to represent crowning.

The generatrix shape AS has a first generatrix shape AS1, a pair of second generatrix shapes AS2, and a pair of third generatrix shapes AS3, as illustrated in FIGS. 2 and 3. The first generatrix shape AS1 is formed in a central portion in the axial direction of the generatrix shape AS (in the present embodiment, the rolling surface 13a of the tapered roller 13), and is composed of a straight line. The second generatrix shape AS2 is formed from each of both ends in the axial direction toward the outside in the axial direction of the first generatrix shape AS1, and is composed of a single arc curve. The third generatrix shape AS3 is formed from each of both ends in the axial direction toward the outside in the axial direction of the second generatrix shape AS2, and is composed of a composite curve of a single arc curve and a logarithmic curve. The pair of second generatrix shapes AS2 and the pair of third generatrix shapes AS3 are arranged axially symmetrically with respect to a center of the generatrix shape AS in the axial direction.

The first generatrix shape AS1, the second generatrix shape AS2, and the third generatrix shape AS3 of the generatrix shape AS are respectively defined based on predetermined mathematical formulas.

Specifically, as illustrated in FIGS. 2 and 3, when a center of the first generatrix shape AS1 in the axial direction is set to an origin 0, an amount of displacement from the origin 0 to the outside in the axial direction is set to X [mm], and the crowning drop amount of the generatrix shape AS is set to $\delta$ [μm], La is set as an axial length from the origin 0 of the first generatrix shape AS1, Lb is set as an axial length of the second generatrix shape AS2, Le is set as an effective contact length between the rolling surface 13a of the tapered roller 13 and the inner ring raceway surface 12a or the outer ring raceway surface 11a, R is set as an arc radius of the single arc curve of the second generatrix shape AS2, Q is set as a contact load between the rolling surface 13a of the tapered roller 13 and the inner ring raceway surface 12a or the outer ring raceway surface 11a, v1 and v2 are set as a Poisson's ratio of the rolling surface 13a of the tapered roller 13 and the inner ring raceway surface 12a or the outer ring raceway surface 11a, E1 and E2 are set as a Young's modulus of the rolling surface 13a of the tapered roller 13 and the inner ring raceway surface 12a or the outer ring raceway surface 11a, and b: ½ of the contact width of Hertz, the crowning drop amount $\delta$ [μm] in the first generatrix shape AS1 is defined by a formula of $0 \leq X \leq La$, $$\delta = 0 \quad \text{[Equation 4]}$$

the crowning drop amount $\delta$ [μm] in the second generatrix shape AS2 is defined by a formula of $La < X \leq La+Lb$, $$\delta = R - \sqrt{R^2 - (X-La)^2}, \quad \text{[Equation 5]}$$

and the crowning drop amount $\delta$ [μm] in the third generatrix shape AS3 is defined by a formula of $$La + Lb < X \leq Le, \quad \text{[Equation 6]}$$

$$\delta = R - \sqrt{R^2 - (X-La)^2} + \frac{Q}{\pi Le}\left(\frac{1-v1^2}{E1} + \frac{1-v2^2}{E2}\right)$$

$$\ln\left\{1 - \left(1 - 0.3033\frac{2b}{Le}\right)\left(\frac{2(X-(La+Lb))}{Le}\right)^2\right\}^{-1}$$

A region where the first generatrix shape AS1 is formed is a range of the origin 0 [mm] or more and La or less in the axial direction. A region where the second generatrix shape AS2 is formed is a range of La or more and La+Lb or less in the axial direction. A region where the third generatrix shape AS3 is formed is a range of La+Lb or more and Le or less in the axial direction.

The crowning drop amount S composed of the second generatrix shape AS2 and the third generatrix shape AS3 is set to 10 μm or more, preferably 15 μm or more, which is effective in extending the life. The crowning drop amount $\delta$ composed of the second generatrix shape AS2 and the third generatrix shape AS3 is preferably 70 μm or less because it may be difficult to process the crowning if the crowning drop amount $\delta$ is too large. That is, the crowning drop amount $\delta$ composed of the second generatrix shape AS2 and the third generatrix shape AS3 is preferably 10 μm to 70 μm. With such a configuration, both the life extension effect and the processability can be achieved.

The crowning drop amount $\delta$ of the crowning shape portion in the third generatrix shape AS3, which is composed of a composite curve of a single arc curve and a logarithmic curve, is composed of a composite of drop amounts of the single arc and the logarithm. The composition ratio of single arc:logarithm is 20%:80% to 50%:50%, which is effective in extending the life. However, in consideration of the processability of the crowning portion, the composition ratio of single arc:logarithm is preferably 30%:70% to 50%:50%. With such a configuration, both the life extension effect and the processability can be achieved.

When the length of the first generatrix shape AS1 is 40% to 75% of a total axial length (hereafter, it may be called "total length") of the first generatrix shape AS1, the pair of second generatrix shapes AS2, and the pair of third generatrix shapes AS3 in the axial direction, it is effective in extending the life of the bearing. However, considering the stability during inspection and measurement of the tapered roller 13, the length of the first generatrix shape AS1 having a straight line shape is preferably half or more of the total length. Therefore, the length of the first generatrix shape AS1 is preferably 55% to 75% of the total length, and in this case, both the life extension effect and the stability at the time of measurement can be achieved.

In addition, it is effective to extend the life by setting the axial length of the third generatrix shapes AS3, each of which is composed of the composite curve of the single arc curve and the logarithmic curve, to 15% to 35% of the total length (total length) of the first generatrix shape AS1, the pair of second generatrix shapes AS2, and the pair of third generatrix shapes AS3. However, considering the processability of crowning, it is desirable that the axial length of the third generatrix shapes AS3 is 20% or more of the total length (total length) of the crowning shape. Therefore, the axial length of the third generatrix shapes AS3 is preferably 20% to 35% of the total length, and in this case, both the life extension effect and the processability can be achieved.

As described above, according to the tapered roller bearing 10 of the present embodiment, since the generatrix shape AS uses both the first generatrix shape AS1 composed of a straight line and the second generatrix shape AS2 composed of an arc curve, under a light load condition to a medium load condition, the contact region between the tapered roller 13 and the outer and inner rings 11 and 12 near the central portion in the axial direction can be efficiently secured as compared with the arc logarithmic crowning of the related art, and further, for example, by making the first generatrix shape AS1 a tangent to the second generatrix shape AS2, a joint between the first generatrix shape AS1 and the second generatrix shape AS2 can be smoothed. As a result, the contact surface pressure at the central portion in the axial direction of the contact region between the tapered roller 13 and the outer and inner rings 11 and 12 is reduced, and a peak value of the contact surface pressure at the joint is suppressed. Therefore, the contact surface pressure distribution can be made uniform and the life of the bearing can be extended. Further, since the generatrix shape AS has the third generatrix shape AS3 composed of the composite curve of the single arc curve and the logarithmic curve, the life of the bearing can be extended even under a heavy load condition. Therefore, according to the present embodiment, the life of the bearing can be extended in a wide load range from the light load condition to the heavy load condition.

Since the crowning drop amount $\delta$ composed of the second generatrix shape AS2 and the third generatrix shape AS3 is 10 μm to 70 μm, both the life extension effect and the processability can be achieved.

In addition, the crowning drop amount $\delta$ in the third generatrix shape AS3 is composed of the composite of the drop amounts of the single arc and the logarithm, and the composite ratio of single arc:logarithm is 20%:80% to 50%:50% (preferably 30%:70% to 50%:50%). Therefore, both the bearing life extension effect and the processability can be achieved.

Since the length of the first generatrix shape AS1 is 55% to 75% of the total axial length of the first generatrix shape AS1, the pair of second generatrix shapes AS2, and the pair of third generatrix shapes AS3, both the life extension effect and the stability at the time of measurement can be achieved.

Since the axial length of the third generatrix shape AS3 is 15% to 35% (preferably 20% to 35%) of the total length, both the life extension effect and the processability can be achieved.

According to the tapered roller bearing 10 of the present embodiment, the first generatrix shape AS1 of the generatrix shape AS is composed of a straight line. Therefore, when inspecting or measuring the tapered roller 13, the straight-line portion thereof can easily stabilize the posture of the tapered roller 13.

EXAMPLE

Figure 4:
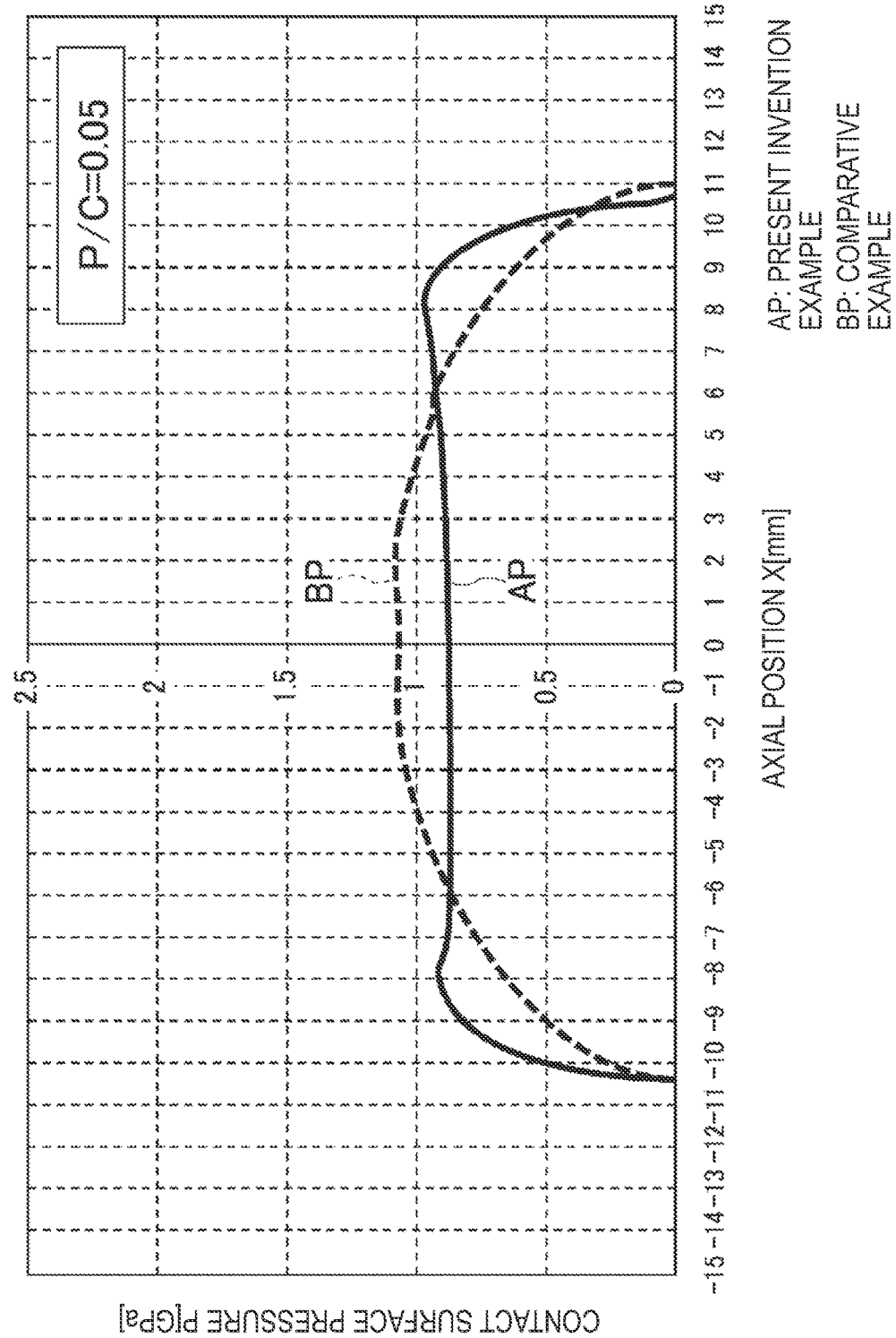
FIG. 4 is a graph illustrating calculation results of contact surface pressure distributions of the present invention example and the comparative example of the present invention.
Figure 5:
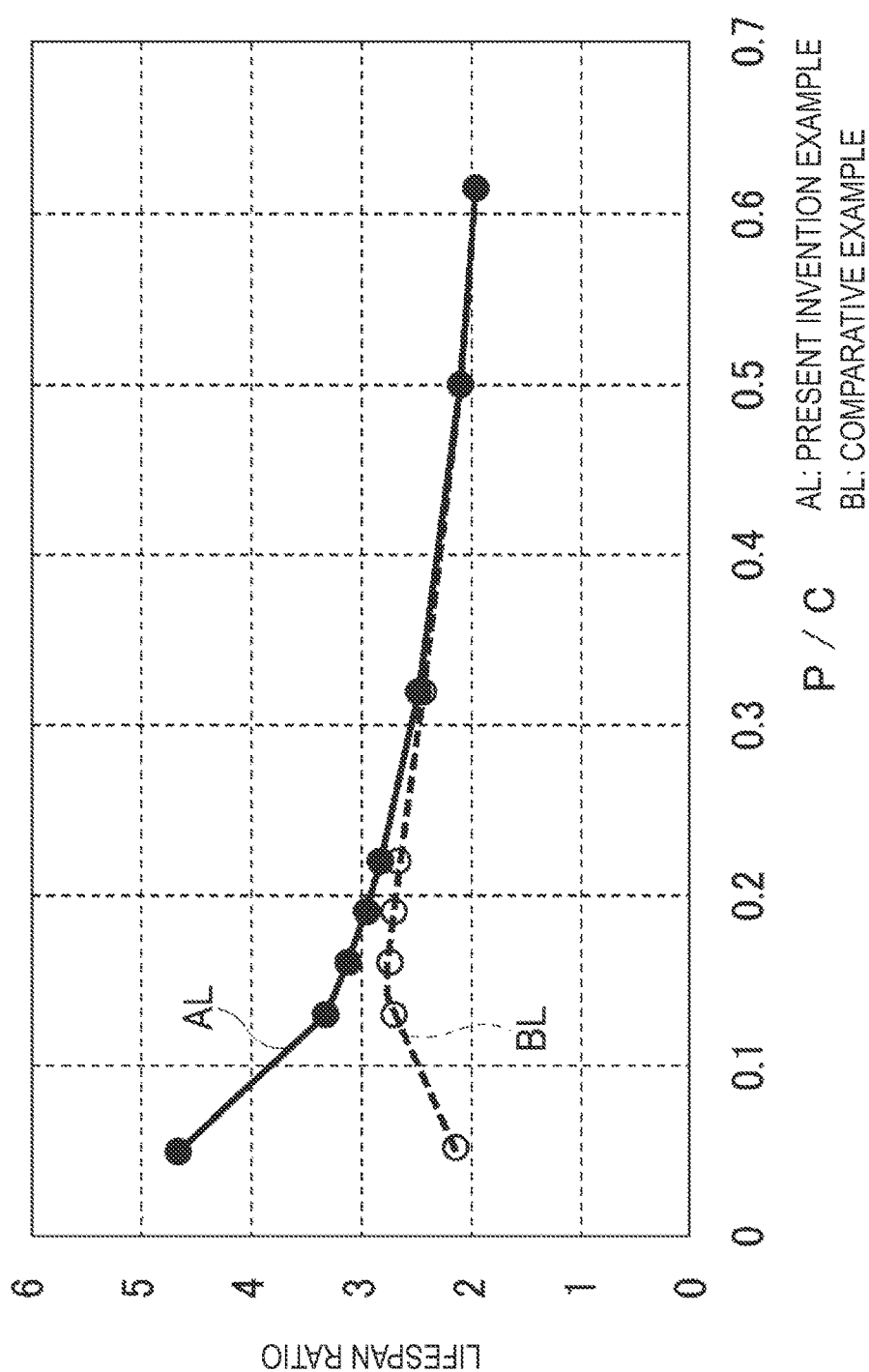
FIG. 5 is a graph illustrating calculation results of a bearing life of the present invention example and the comparative example of the present invention.

In order to confirm the operation effect of the present invention, a plurality of types of comparison calculations (simulations) between the present invention example and a comparative example are performed. The results are illustrated in FIGS. 4 and 5.

FIG. 3 illustrates the crowning shapes of the present invention example and the comparative example. FIG. 3 illustrates the crowning drop amount $\delta$ [μm] of the crowning when a center in the axial direction is set to the origin 0 and the displacement amount from the origin 0 to the outside in the axial direction is set to X [mm]. Since the crowning formed on the rolling surface 13a of the tapered roller 13 is axially symmetric (see FIG. 2) with respect to the center in the axial direction, FIG. 3 shows only one half of the crowning in the axial direction with X≥0.

In the roller bearing of the present invention example, the crowning of the present invention described above is applied to the rolling surface 13a of the tapered roller 13, and the generatrix shape thereof is indicated by reference letters AS in FIG. 3. That is, the generatrix shape AS of the present invention example is composed of the first generatrix shape AS1 composed of a straight line, the second generatrix shape AS2 composed of a single arc curve, and the third generatrix shape AS3 composed of a composite curve of a single arc curve and a logarithmic curve.

In the roller bearing of the comparative example, the crowning described in Patent Literature 1 is applied to the rolling surface 13a of the tapered roller 13, and the generatrix shape thereof is indicated by reference letters BS in FIG. 3. The generatrix shape BS in the comparative example is composed of an arc curve BS1 (first generatrix shape in the comparative example) formed in the central portion in the axial direction and a composite curve BS2 (second generatrix shape in the comparative example) of an arc curve and a logarithmic curve formed from each of both ends in the axial direction to an outer end portion in the axial direction of the arc curve BS1.

Then, a crowning drop amount $\delta$ [μm] of the crowning of the comparative example is calculated using the following [Formula 1] and [Formula 2] described in Patent Literature 1.

[Equation 7]

$0 \leq X \leq L1$, $\delta = R - \sqrt{R^2 - X^2}$ [Formula 1]

[Formula 2]

$L1 < X, \delta = R - \sqrt{R^2 - X^2} + \dfrac{D2}{\ln(1-k)} \ln\left\{1 - k\dfrac{(X-L1)^2}{L2^2}\right\}$ [Equation 8]

L1: Axial length from origin 0 of first generatrix shape BS1 of comparative example L2: Axial length of second generatrix shape BS2 of comparative example R: Arc radius of single arc curve of first generatrix shape BS1 of comparative example D2: Logarithmic curve component of crowning drop amount at end of effective raceway of comparative example k: Parameter for adjusting roundness of logarithmic portion (0<k<1)

FIG. 4 illustrates the results obtained by calculation of the distribution of a contact surface pressure P [GPa] at the axial position X [mm] when a constant load is applied to the roller bearings of the present invention example and the comparative example. The load condition is a light load condition in which a ratio P/C of an acting load P to a dynamic rated load C of the bearing is 0.05. A curve AP in FIG. 4 is the result of the present invention example, and a curve BP is the result of the comparative example.

As is clear from FIG. 4, in the case of the comparative example, it is found that the contact surface pressure at the central portion of the contact region is high because the contact region cannot be sufficiently secured. On the other hand, in the case of the present invention example, it is found that the contact surface pressure distribution became uniform because the contact region can be sufficiently secured.

FIG. 5 illustrates the results of calculating the bearing life when a constant load is applied to the roller bearings of the present invention example and the comparative example. The horizontal axis of the graph in FIG. 5 takes the P/C in the range of 0.05 to 0.615, and the vertical axis takes the ratio to the life obtained in this calculation when a rated fatigue life is set to 1. A curve AL in FIG. 5 is the result of the present invention example, and a curve BL is the result of the comparative example.

As is clear from FIG. 5, it is found that the present invention example has a longer life than the comparative example under the light load condition to the medium load condition in which the P/C is in the range of 0.05 to 0.2. It is found that the present invention example can obtain the same life as that of the comparative example under the heavy load condition in which the P/C is in the range of 0.2 to 0.615. Therefore, it is found that the present invention can achieve a long bearing life in a wide load range from the light load condition to the heavy load condition.

Figure 6:
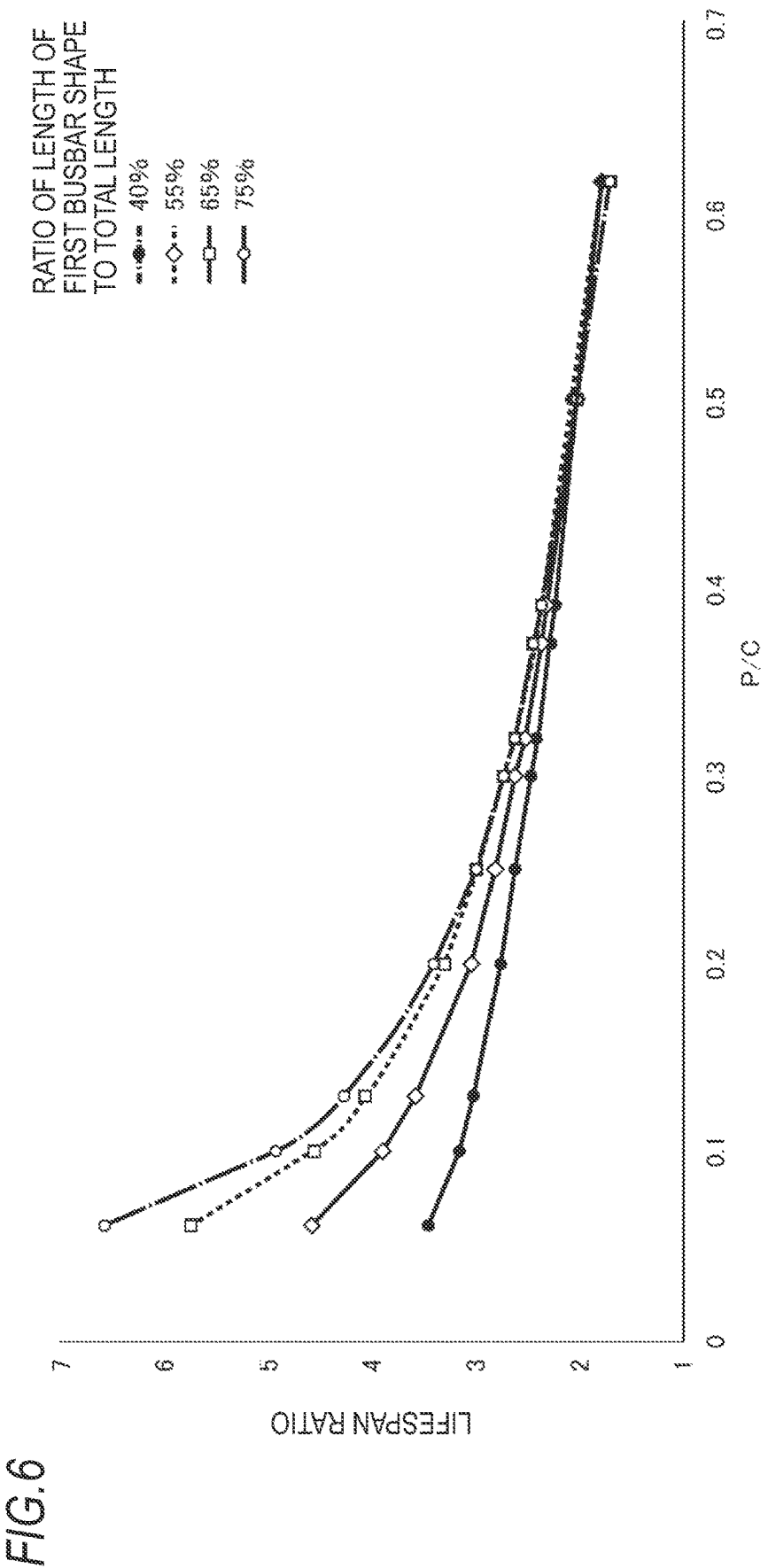
FIG. 6 is a graph illustrating calculation results of the bearing life when a constant load is applied to the roller bearing.

Next, an effect of the length of the first generatrix shape AS1 on the bearing life will be described. FIG. 6 is a graph illustrating the calculation result of the bearing life when a constant load is applied to the roller bearing. The horizontal axis of the graph in FIG. 6 takes a P/C in the range of 0.05 to 0.615, and the vertical axis takes the ratio to the life obtained in this calculation when the rated fatigue life is set to 1. Under the light load condition to the medium load condition in which the P/C is in the range of 0.05 to 0.2, it can be found that a roller bearing in which the length of the first generatrix shape AS1 is 55% to 75% of the total axial length (total length) of the first generatrix shape AS1, the pair of second generatrix shapes AS2, and the pair of third generatrix shapes AS3 has a longer life than that of 40%.

Figure 7:
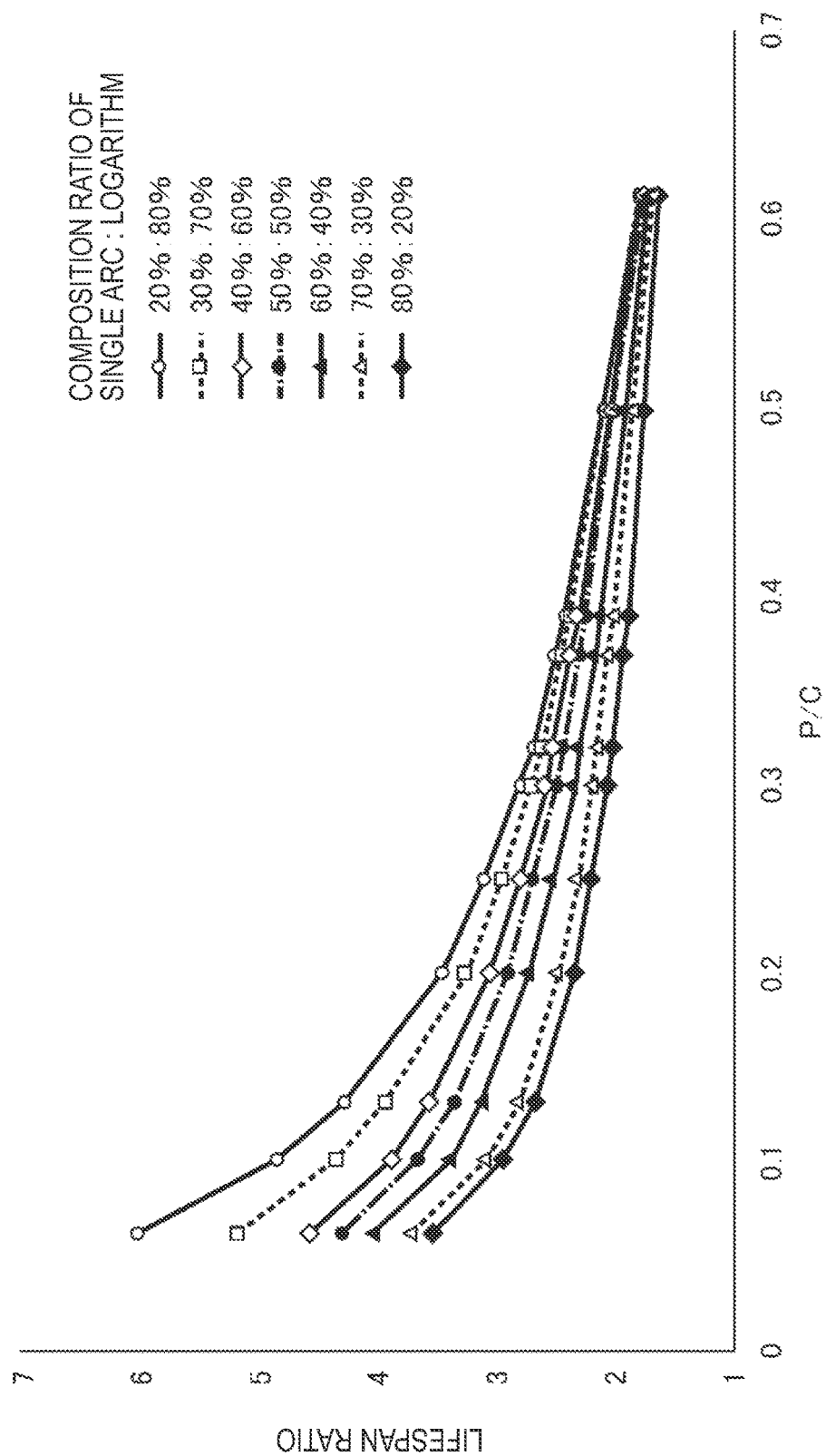
FIG. 7 is a graph illustrating calculation results of the bearing life when a constant load is applied to the roller bearing.

Next, the effect of the composition ratio of single arc: logarithm on the bearing life when the crowning drop amount δ of the crowning shape portion in the third generatrix shape AS3 composed of a composite curve of a single arc curve and a logarithmic curve is composed of the composite of the drop amounts of the single arc and the logarithm will be described. FIG. 7 is a graph illustrating calculation results of the bearing life when a constant load is applied to the roller bearing. The horizontal axis of the graph in FIG. 7 takes the P/C in the range of 0.05 to 0.615, and the vertical axis takes the ratio to the life obtained in this calculation when the rated fatigue life is set to 1. Under the light load condition to the medium load condition in which the P/C is in the range of 0.05 to 0.2, it can be found that a roller bearing in which the composition ratio of single arc:logarithm is in the range of 20%: 80% to 50%:50% has a longer life than that having the composition ratio of 60%:40% to 80%:20%.

The present invention is not limited to those exemplified in the above embodiment, and can be appropriately modified without departing from the gist of the present invention. For example, in the above embodiment, the case where the present invention is applied to a tapered roller bearing is exemplified, but the present invention is not limited thereto. The present invention may be applied to a roller bearing such as a cylindrical roller bearing, a needle-shaped roller bearing, a spherical roller bearing, and the like in which a roller and a raceway ring are in line contact with each other. The present invention may be applied not only to a roller bearing which supports a radial load but also to a roller bearing which supports a thrust load.

REFERENCE SIGNS LIST

10: tapered roller bearing (roller bearing)
11: outer ring
11a: outer ring raceway surface
12: inner ring
12a: inner ring raceway surface
12b: flange portion
12c: flange portion
12d: relief portion
13: tapered roller (roller)
13a: rolling surface
13b: axial end surface
13c: axial end surface
13d: chamfered portion
AS: crowned generatrix shape
AS1: first generatrix shape
AS2: second generatrix shape
AS3: third generatrix shape

The invention claimed is:

1. A roller bearing comprising:
an outer ring having an outer ring raceway surface on an inner peripheral surface;
an inner ring having an inner ring raceway surface on an outer peripheral surface; and
a plurality of rollers rotatably arranged between the outer ring raceway surface and the inner ring raceway surface and having rolling surfaces on outer peripheral surfaces, wherein
crowning is applied to at least one of the outer ring raceway surface, the inner ring raceway surface, and the rolling surface, and
a generatrix shape to which the crowning is applied includes,
a first generatrix shape which is formed in a central portion in an axial direction of at least one of the outer ring raceway surface, the inner ring raceway surface, and the rolling surface of the roller and is composed of a straight line,
a pair of second generatrix shapes which are formed from both ends in the axial direction toward the outside in the axial direction of the first generatrix shape and are composed of a single arc curve, and a pair of third generatrix shapes which are formed from both ends in the axial direction toward the outside in the axial direction of the second generatrix shape and are composed of a composite curve of a single arc curve and a logarithmic curve, wherein when a center of the first generatrix shape in the axial direction is set to an origin 0, an amount of displacement from the origin 0 to the outside in the axial direction is set to X, and a crowning drop amount of the crowning is set to $\delta$, La is set as an axial length from the origin 0 of the first generatrix shape, Lb is set as an axial length of the second generatrix shape, Le is set as an effective contact length between the rolling surface of the roller and the inner ring raceway surface or the outer ring raceway surface, R is set as an arc radius of the single arc curve of the second generatrix shape, Q is set as a contact load between the rolling surface of the roller and the inner ring raceway surface or the outer ring raceway surface, v1 and v2 are set as a Poisson's ratio of the rolling surface of the roller and the inner ring raceway surface or the outer ring raceway surface, E1 and E2 are set as a Young's modulus of the rolling surface of the roller and the inner ring raceway surface or the outer ring raceway surface, and b is set as ½ of a contact width of Hertz, the crowning drop amount $\delta$ in the first generatrix shape is defined by a formula of $0 \leq X \leq La$ $$\delta = 0, \qquad \text{[Equation 1]}$$

the crowning drop amount $\delta$ in the second generatrix shape is defined by a formula of $La < X \leq La + Lb$ $$\delta = R - \sqrt{R^2 - (X - La)^2}, \text{ and} \qquad \text{[Equation 2]}$$

the crowning drop amount $\delta$ in the third generatrix shape is defined by a formula of $La + Lb < X \leq Le$ [Equation 3]

$$\delta = R - \sqrt{R^2 - (X - La)^2} + \frac{Q}{\pi Le}\left(\frac{1 - v1^2}{E1} + \frac{1 - v2^2}{E2}\right)$$

$$\ln\left\{1 - \left(1 - 0.3033\frac{2b}{Le}\right)\left(\frac{2(X - (La + Lb))}{Le}\right)^2\right\}^{-1}$$

2. The roller bearing according to claim 1, wherein a length of the first generatrix shape is 55% to 75% of a total axial length of the first generatrix shape, the pair of second generatrix shapes, and the pair of third generatrix shapes.

3. The roller bearing according to claim 2, wherein an axial length of the third generatrix shape AS3 is set to 15% to 35% of a total axial length of the first generatrix shape AS1, the pair of second generatrix shapes AS2, and the pair of third generatrix shapes AS3.

4. The roller bearing according to claim 1, wherein a sum of the crowning drop amounts of the crowning applied when the crowning is applied to at least two or more of the outer ring raceway surface, the inner ring raceway surface, and the rolling surface of the roller matches a crowning drop amount of the crowning applied when the crowning is applied to only one of the outer ring raceway surface, the inner ring raceway surface, and the rolling surface of the roller.

* * * * *